United States Patent
Kato et al.

[11] Patent Number: 6,097,476
[45] Date of Patent: Aug. 1, 2000

[54] DISTANCE MEASURING APPARATUS

[75] Inventors: Masahiko Kato, Akiruno; Eiji Yanagi, Yokohama, both of Japan

[73] Assignees: Olympus Optical Co., Ltd.; Takata Corporation, both of Tokyo, Japan

[21] Appl. No.: 09/189,083

[22] Filed: Nov. 9, 1998

[30] Foreign Application Priority Data

Nov. 13, 1997 [JP] Japan ..................................... 9-312177

[51] Int. Cl.⁷ ............................... B60T 7/16; B62D 1/24; G01C 3/08
[52] U.S. Cl. ....................... 356/4.01; 180/169; 356/141.1
[58] Field of Search ................. 180/169; 356/3.01–5.15, 356/141.1

[56] References Cited

U.S. PATENT DOCUMENTS

| | | |
|---|---|---|
| 3,864,678 | 2/1975 | Yamanaka et al. . |
| 3,892,483 | 7/1975 | Saufferer . |
| 4,681,431 | 7/1987 | Sims et al. . |
| 5,283,622 | 2/1994 | Ueno et al. . |
| 5,313,262 | 5/1994 | Leonard ................................... 180/169 |
| 5,341,346 | 8/1994 | Youlton . |
| 5,831,717 | 11/1998 | Ikebuchi ................................... 356/4.01 |
| 5,877,849 | 3/1999 | Ramer et al. ........................... 356/3.01 |

FOREIGN PATENT DOCUMENTS 0 717 288 A1  6/1996  European Pat. Off. .
3 637 165 A1  5/1988  Germany .

*Primary Examiner*—Stephen C. Buczinski
*Attorney, Agent, or Firm*—Frishauf, Holtz, Goodman, Langer & Chick, P.C.

[57] ABSTRACT

Distance sensors are mounted on both ends of a vehicle and have light transmitting and receiving sections. A distance to an object is independently measured by alternately transmitting "one-side-only enlarged light beams" at a time interval and receiving corresponding reflected beams from the object. In an overlapped area of the "one-side-only enlarged light beams", the distance from the vehicle to the object, as well as the azimuth of the object, is measured by a triangulation distance measurement using an interval between the distance sensors as a baseline. The lengths of the "one-side-only enlarged light beams" in the running direction of the vehicle are about 50m and a width vertical to the running direction of the overlapped area is about 2m slightly greater than a width of the vehicle.

13 Claims, 4 Drawing Sheets

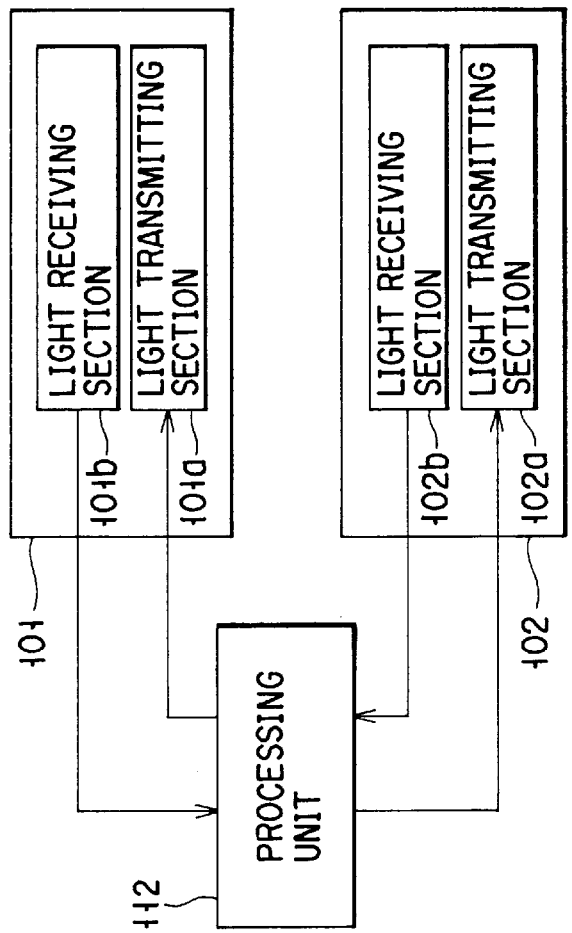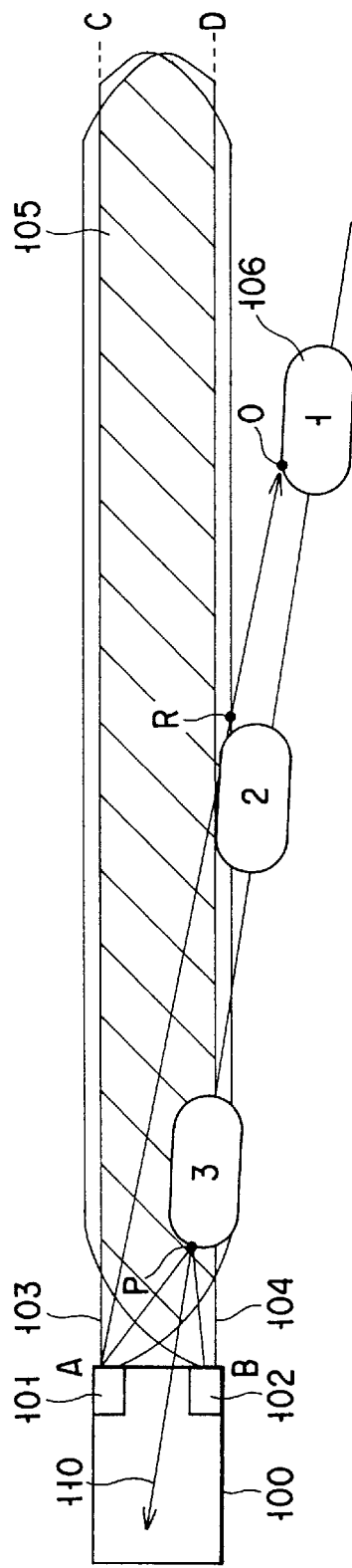
FIG. 1A
FIG. 1B

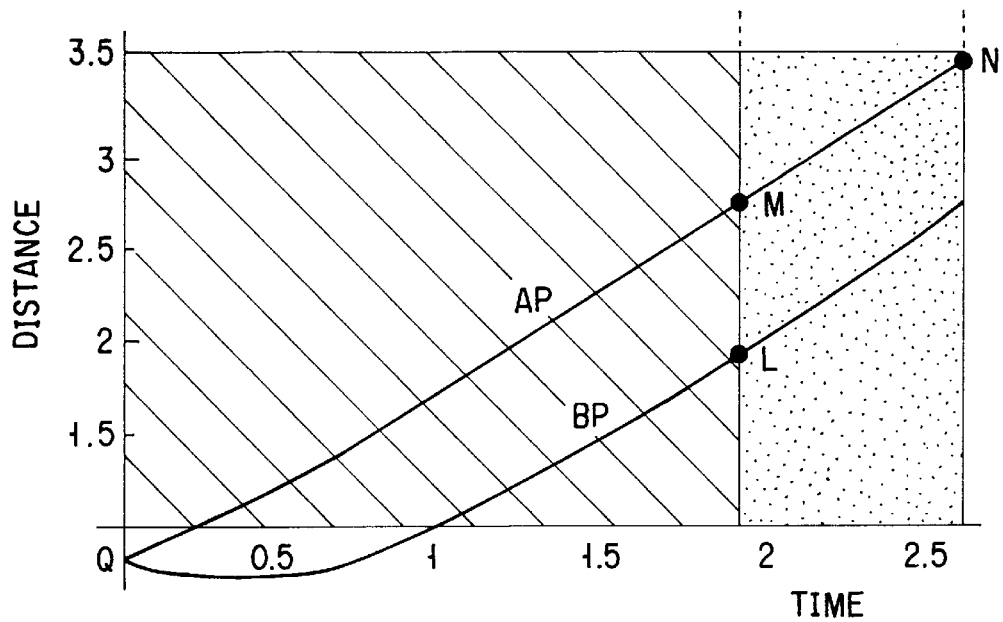
FIG. 4
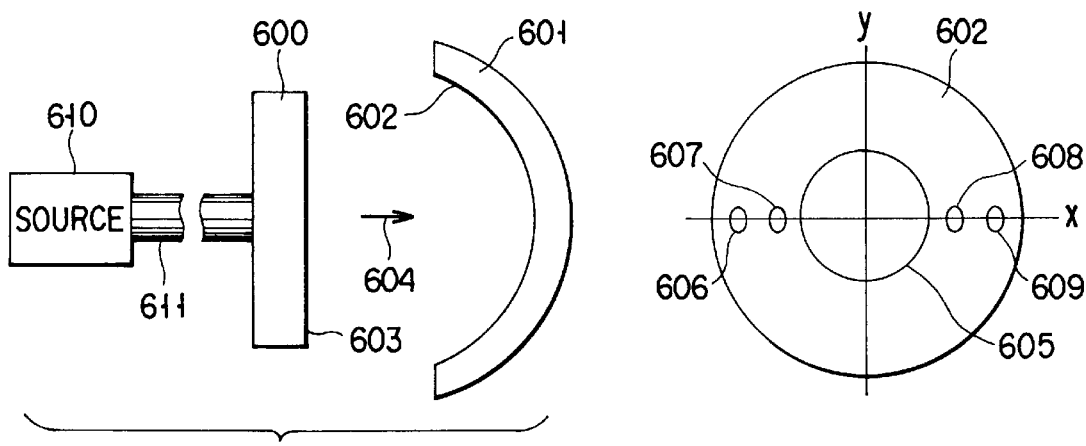
FIG. 6A
FIG. 6B

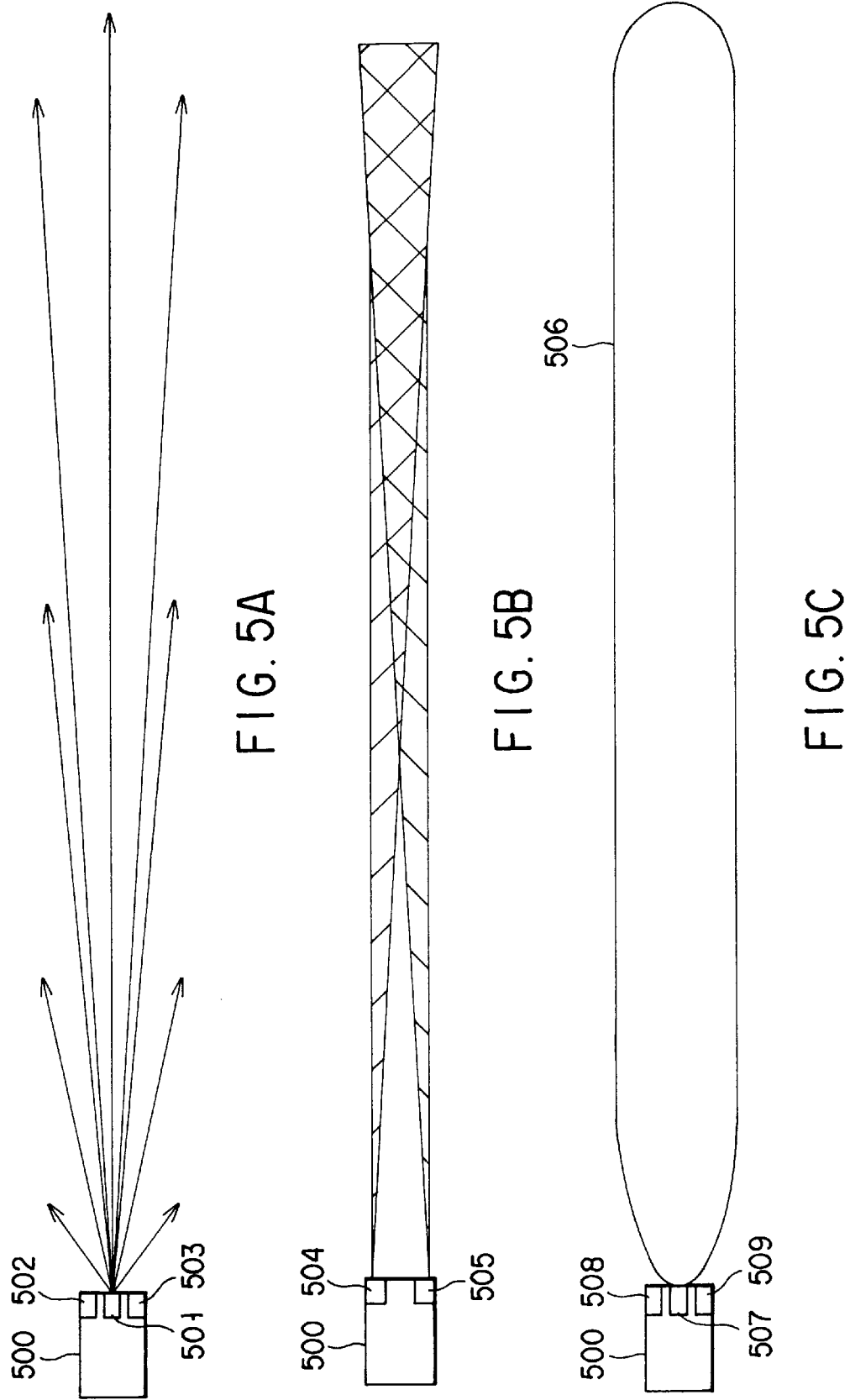

DISTANCE MEASURING APPARATUS

BACKGROUND OF THE INVENTION

The present invention relates to a distance measuring apparatus for measuring a distance to, and a direction of, an obstacle by transmitting light beams at the obstacle, such as an automobile motorbike building and road-side structure, and receiving reflected beams from the obstacle.

An airplane is equipped with a flight recorder for automatically recording the states of flying, such as the altitude and speed, its ascent or descent speed, azimuth and engine output, on a metal foil and storing the recorded data in an impact-/heat-resistant black box. In the case of an accident, the flight recorder, together with a voice recorder, is used for investigation into a cause for the accident.

In contrast to an airplane, an automobile is not equipped with a recorder which corresponds to the flight recorder. Attempts have been made to measure and record a running path of the automobile by utilizing not only the speed, acceleration rate and angular acceleration (yow rate) but also the position information from the GPS based on an artificial satellite. A vehicle-to-vehicle distance measuring apparatus is known which measures a distance to a forwardly positioned vehicle or obstacle and issues collision warning to a driver.

At the collision accident of the vehicle, it is indispensable to clarify a relative position of a driver's own vehicle to the obstacle, together with its direction, just before it collides with the obstacle and, while also utilizing the information such as the driver's speed and acceleration rate (including the angular acceleration rate), decide what action he or she should have taken under this situation. This is indispensable to the investigation into the cause for the accident involved.

A conventionally adopted method comprises grasping a driver's running path together with the speed/acceleration information. In order to clarify a colliding path, the position information from the GPS is not accurate enough and includes nothing at all about a colliding object.

In the case where, at a vehicle/vehicle collision accident, both are equipped with a device capable of measuring/recording their accurate collision path together with their speed/acceleration information, it appears possible to make an investigation into the cause for the vehicle collision. If, on the other hand, one vehicle only has such a device or if the driver's vehicle collides with an obstacle such as the building or roadside structure, various difficulties are encountered.

The colliding distance information can be obtained by a vehicle/vehicle distance sensor. This method is broadly classified into two, that is, a fixed beam method according to which the distance information only is obtained and a scan beam method according to which it is possible to obtain both the distance and direction information.

The former method is not adequate as a means for investigation into the cause for the collision accident because it is not possible to obtain the direction information. The latter method has the advantage of obtaining both the distance and direction information but it is necessary to effect mechanical scanning and it also requires a great amount of time to do so. The latter method is not suitable to the case where the colliding path along which both vehicles are running at high speeds is measured/recorded just before their collision occurs.

Further, according to these methods, the monitoring area extends over a distance of more than 100 m in a forward direction of the vehicle and also covers not only a currently running line but also an adjacent line on the road, that is, inconveniently also covers, as a measuring object, an obstacle low in a risk of collision.

BRIEF SUMMARY OF THE INVENTION

It is accordingly the object of the present invention to provide a distance measuring apparatus which can measure, in a short time period, a distance from a movable body such as a vehicle to an object or obstacle present in a forward direction of the movable body and an azimuth of the object with respect to the movable body.

According to the present invention there is provided a distance measuring apparatus which is mounted on a movable body comprises at least one wave transmitting device for transmitting waves in a forward direction, at least one wave detecting device for detecting the waves reflected by the object and returning to the apparatus, and a processing device for processing the distance from the movable body to the object and the azimuth of the object with respect to the movable body on the basis of outputs from the wave detecting device, wherein a measurable area formed by the waves transmitted from the at least one wave transmitting device has a shape with a generally constant width extending for a predetermined length in the forward direction.

The waves are assumed to be electromagnetic waves or light waves or acoustic waves. To avoid noise, the acoustic waves used are preferably out of audible frequency. For safety to visual inspection, the electromagnetic waves used are preferably waves having frequencies out of visible radiation, e.g., infrared light waves. For long range and detection accuracy, the electromagnetic waves are preferable to the acoustic waves. Millimeter waves may be used as the waves. Use of the millimeter waves has an advantage that the speed information is also obtained by Doppler measurement in addition to the distance and azimuth information.

The distance measuring apparatus may have two wave transmitting devices, and two wave detecting devices. The wave transmitting devices, the wave detecting devices, and the processing device correspond to light transmitting sections 101a and 102a, light receiving sections 101b and 102b, and a processing section unit 112, which are shown in FIG. 1A concerning to a first embodiment of the invention described hereinafter, respectively.

A mount position of the wave transmitting section or sections is not limited. For example, in an apparatus having two wave transmitting sections, the sections are preferably mounted on both ends of the movable body. In an apparatus having single wave transmitting section, the section is preferably mounted on a center of the movable body. The light receiving sections are preferably mounted on both ends of the movable body for processing of triangulation.

In an apparatus having two light transmitting sections, an area which is inside an overlapped area of two waves transmitted from the two wave transmitting sections and in which waves are received by the wave detecting sections with higher intensity than a predetermined value defines the measurable area.

Where two light transmitting sections are provided, they transmit the waves alternately. By this alternate transmission, the source of the wave received by a light receiving section can be easily identified. That is possible to detect the light transmitting section, which transmits those waves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a block diagram showing an arrangement of a distance measuring apparatus according to an embodiment of the present invention;

FIG. 1B shows a contour of a measuring boundary area defined by light beams transmitted from a vehicle with the distance measuring apparatus mounted thereon;

FIG. 4 is a graph showing a transition in distances AP and BP measured by respective distance sensors in FIG. 1B;

FIG. 5A is a view showing a first variant of the embodiment of the present invention;

FIG. 5B is a view showing a second variant of the embodiment of the present invention;

FIG. 5C is a view showing a third variant of the embodiment of the present invention;

FIG. 6A is a side view showing a device for transmitting a plurality of beams of a fixed millimeter wave in the first variant of the embodiment of the present invention; and FIG. 6B is a front view showing the device illustrated in FIG. 6A.

DETAILED DESCRIPTION OF THE INVENTION

Figure 2:
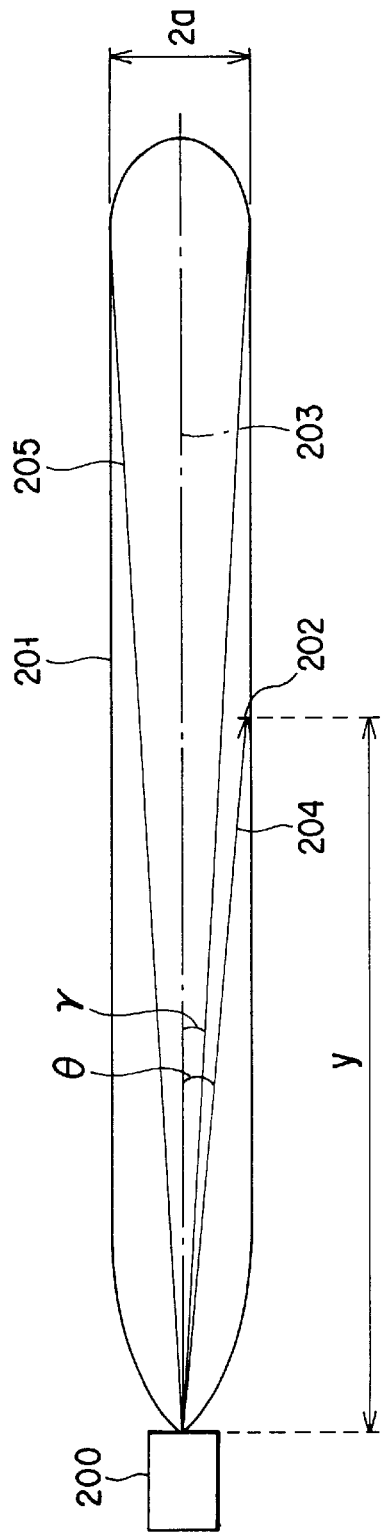
FIG. 2 is a view for explaining an "enlarged light beam" in the apparatus.

Preferred embodiments of the present invention will be explained below with reference to the accompanying drawings.

A distance measuring apparatus according to the embodiment of the present invention has two distance sensors 101, 102 and processing unit 112 as shown in FIG. 1A. The distance sensors 101 and 102 have light transmitting sections 111a and 102a, respectively, for transmitting light beams for distance measurement and light receiving sections 101b and 102b, respectively, for detecting reflected beams from an object such as an obstacle.

The light receiving sections 101b and 102b include light receiving elements, which generate signals corresponding to received amounts of light. The light receiving elements may be, for example, PIN diodes. Each of the light transmitting sections 101a and 102a includes a light source for generating a light beam and a light transmitting lens for allowing the light beam from the light source to be shaped.

The distance sensor 101 and 102 are mounted, preferably, on both front-side ends of a movable body, such as a vehicle or automobile 100, as shown in FIG. 1B. The light sources of the light transmitting sections 101a and 102a are alternately lit at time intervals of, for example, one millisecond, and the light transmitting sections 101a and 102a transmit "one-side-only enlarged light beams" 103 and 104, respectively.

Here, the term "enlarged light beam" is intended to mean a light beam which forms a measurable area having a substantially constant width throughout a predetermined length in a transmitted direction. In that measurable area, light reflected by an object or obstacle having normal reflectivity has intensity sufficient for detection.

FIG. 2 shows an "enlarged light beam" 201 transmitted from the distance measuring apparatus mounted on a movable body such as automobile 200. In this enlarged light beam, the relationship between its transmitted direction and intensity is adjusted by a transmitting lens described hereinafter. Let us consider a case where objects are arranged at a variety of points in front of the apparatus and the objects whose reflected beams are measured to have the same intensity by detectors are connected together to define an area. In this case, the shape of this area is adjusted in such a manner that the area extends a substantially constant width throughout a predetermined length in the transmitted direction.

Since the "enlarged light beam" has such a feature in divergence, the measurable area has a substantially constant width throughout a predetermined length in the transmitted direction (see in FIG. 2). The predetermined length preferably includes a length from 0.5 m to 50 m in a forward direction of the vehicle. Referring to FIG. 2, the width of the light beam is kept at a constant value 2a in a considerable range of the length of the beam.

The "enlarged light beam" 201 includes a light beam 204 having an emission angle θ greater than an opening angle γ of an ordinary light beam 205. This allows the detection of a target 202 situated outside the ordinary light beam 205.

In FIG. 2, the target 202 is situated at a boundary of the detection area, that is, at a boundary position beyond which it is not detected. In other words, out of these scattered light beams on the target 202, a light amount received at the light receiving element on the vehicle 200 is a marginal value. This does not vary even if the target 202 is moved along the boundary parallel to an optical axis 203.

The "enlarged light beam" 201 can be preferably applicable to the case where an obstacle in a front direction of the vehicle 200 is detected without an entire loss but is detected to only a lowest possible extent if the obstacle is outside a light transmission path. This is useful to the simplification of a recognition software for the obstacle. The "enlarged light beam" is disclosed in another application No. 09/189,084 filed by the present applicants and later clarified by an amendment and the contents of the application are here inserted by reference.

The "one-side-only enlarged beam" corresponds to a half of the aforementioned "enlarged light beam" divided by a centerline. In FIG. 2, an upper or lower half with respect to a centerline 203 consists a "one-side-only enlarged beam".

Although not shown in the drawings, there is a very small amount of light radiated in the direction in which the light beam is not enlarged. Such a light beam includes light traveling into the non-enlarged region with an angle defined by the transmitting optical system.

Such "one-side-only enlarged light beam" is created, as will be set out below, for instance, using a light transmission lens partly equipped with a diffusion element.

In FIG. 1B, the light beam 103 is a right-side-only enlarged light beam and AC represents a left-end of the light transmission beam and no light is sent to a side more left than AC. A side more right than the AC is the same as the "enlarged light beam" and has a light beam component (that is, the light beam) travelling in a direction indicated by an arrow AO for example and this is situated outside a light beam by the light transmission lens not equipped with a diffusion element.

An obstacle having a standard reflectivity is for the first time detected at a marginal position as indicated at a point R. An obstacle of very high reflectivity, such as a reflector, provided on the rear of an automobile or situated on a roadside has a possibility of being detected even at a position of a point 0. In other words, the obstacle situated in a position more left than the AC is not detected by the light beam 103 but there is a possibility that the obstacle situated more right than AC will be detected beyond the marginal position depending upon its reflectivity.

Similarly, the light beam 104 is the "left-side-only enlarged light beam and an obstacle situated more right than BD is not detected by the light beam 104 but, if being situated more left than BD, has a possibility of being detected beyond the marginal position depending upon its reflectivity.

Figure 3:
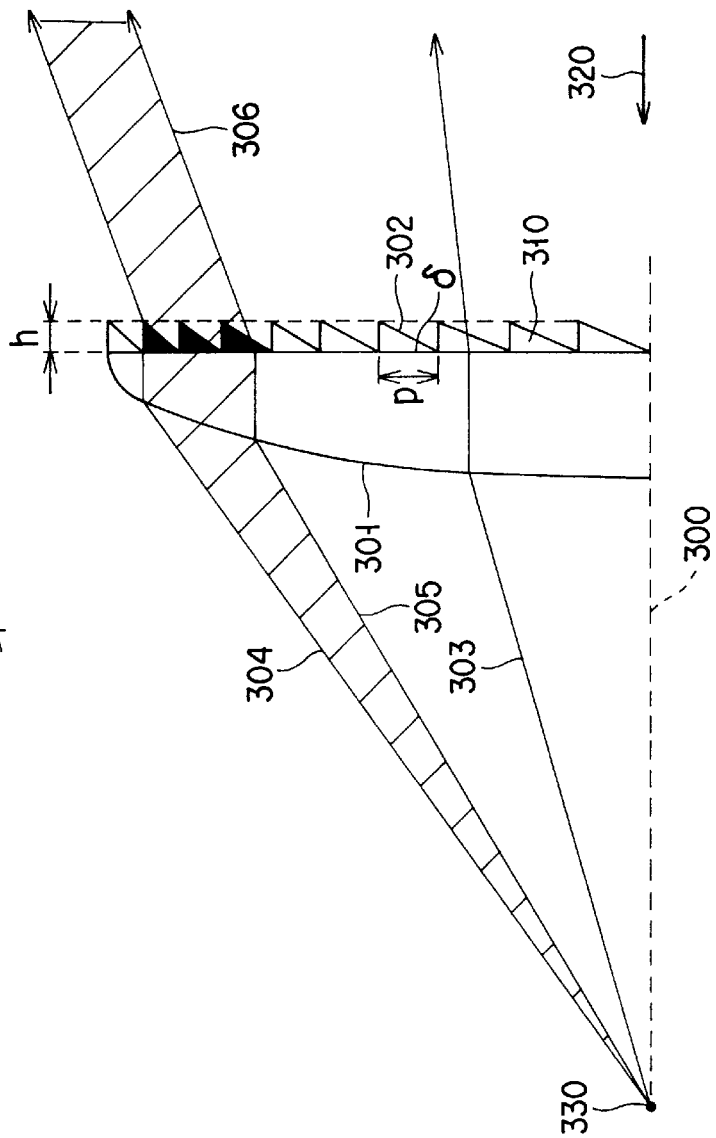
FIG. 3 is a cross-sectional view showing a light transmitting lens for creating "one-side-only enlarged light beams" in the apparatus.

As shown in FIG. 3, a light transmitting lens 301 for creating the "one-side-only enlarged light beam" is equipped at some area with a diffusion element 310. The diffusion element 310 is comprised of many minute prisms 302 each having an equal height h but different pitches p depending upon the distance from an optical axis 300. Their apex angles δ 300 also differ depending upon a distance from the optical axis 300.

The light transmitting lens 301 has the function of collimating a divergent light beam, which is emitted from the light source 330 to a beam of a predetermined opening angle. Since the many minute prisms 302 in the diffusion element 310 have different apex angles δ dependent upon their locations, the light beams 303, 304 are incident on different positions at different deflection angles.

A hatched area between the light beams 304 and 305 represents a light beam divergent from a light source 330 in a different direction and this beam, after being collimated by the light transmitting lens 301 into a beam of a substantially equal direction, penetrates those minute prisms 302 indicated by solid blacks in FIG. 3. If the minute prisms indicated by the solid black have equal pitches, then the penetrated light beams are converted into the beam propagating in a predetermined direction as indicated by a light beam 306. In other words, the minute prisms of the same pitches have the function of converting a fine beam of light divergent from the light source 330 to a fine beam light propagating in the predetermined direction.

The diffusion element 310 is formed at a specified area in a plane as viewed from an arrow 320 in FIG. 3. Although the light beam passing through the portion of the diffusion element 310 in the light transmitting lens 301 undergoes a predetermined deflection varying from location to location, the light beam passing through the other portion of the light transmitting lens 301 undergoes no deflection and is directly collimated. In other words, the ratio of the light beam undergoing the deflection is adjusted by an area where the deflection element 310 is created. For this reason, it is possible that when, in FIG. 2, the target 202 is moved along the boundary parallel to the optical axis 203, an amount of light which is received by the light receiving element is set equal to a given marginal value.

In FIG. 1B, it is assumed that an obstacle 106 collides with the vehicle 100 past a path as indicated by an arrow 110. On its way, the typical positions of the obstacle 106 are represented by 1, 2 and 3. The sensors 101 and 102 make distance measurements alternately in a time sequence. When the obstacle 106 enters in an overlapped area (hatched area) 105 of the "right-side-only enlarged light beam 103" and "left-side-only enlarged light beam" 104, for example, the obstacle 104 comes to a position indicated by 3, then a position AP leading to the obstacle 106 and distance BP leading to the obstacle 106 are measured independently from the distance sensors 101 and 102, respectively.

The measurements are done by the processing section 112 on the basis of signals from the light receiving sections 101b and 102b. In the processing section 112, an average distance from the vehicle 100 to the obstacle 106 and azimuth of the obstacle 106 to the vehicle 100 are found in accordance with a triangulation distance measurement with a distance AB between the two distance sensors 101 and 102 set as a baseline length. That is, the overlapped area 105 defines a measurable area in which the distance and azimuth of the obstacle 106 can be measured.

The travelling lengths of the light beams 103 and 104 are about 50 m and the width vertical to the travelling direction of the overlapped area 105 of these light beams 103 and 104 is selected to be about 2 m somewhat wider than the width of the vehicle 100. The alternately lighting timing (time interval) of the two light beams 103 and 104 is selected to be below 1 msec and the distance measuring accuracy is selected to be about 0.1 m within 15 m.

When the obstacle 106 is in a position indicated by 1, an object of an ordinary reflectivity is not observed. There are sometimes the cases where a reflector, etc., of a higher reflectivity has its distance from the distance sensor 101 measured by the "right-side-only enlarged light beam 103". In this case, in which azimuth the obstacle 106 is located relative to the vehicle 100 cannot be specified.

When the obstacle 106 comes to the position as indicated by 2, it is possible to measure the distance also by the "left-side-only enlarged light beam" 104. And the distance from the distance sensor 101 and that from the distance sensor 102 are measured, so that the azimuth of the obstacle 106 can be specified.

When the obstacle 106 comes to the position indicated by 3, it follows that, due to the size of the obstacle 106, the measuring distances AP and BP become an average distance from the distance sensors 101 and 102.

FIG. 4 is a graph showing a transition of the measured distances AP and BP, noting that the ordinate axis represents the measured distances and the abscissa the time. The graduations are of an arbitrary scale. In the graph, the hatched area represents the overlapped area 105, in FIG. 1B, where the distance is measured by both the distance sensors 101 and 102 and the stippled area represents the area where the distance is measured by only one of both the distance sensors.

In FIG. 1B it follows that, when the obstacle 106 comes to the position indicated by 2, the measurement of the distance is started by the distance sensor 101. This corresponds to the point N on a curve AP in FIG. 4.

When the obstacle 106 enters the overlapped area 105 of the light beams 103 and 104, the measurement of the distance is started by the distance sensor 102. This corresponds to the point M on the curve AP and point L on the curve BP in FIG. 4.

The obstacle 106 collides with the vehicle 100 past the position indicated by 3 and this collision point corresponds to a point Q in FIG. 4. Normally, the measurement of the distance is effected to a position about 0.5 to 1 m just in front of the vehicle 100. And the curve AP and curve BP are recorded to points where these curves intersect with the abscissa (time axis).

The distance measuring apparatus of the present embodiment, as mentioned above, comprises two wave transmitting sections which alternately transmit light beams at time intervals. This alternate transmission allows detecting which light transmitting section transmits the light beam received by a light receiving section. The light beams form an overlapped area which defines a measurable area having a substantially constant width throughout a predetermined length. The predetermined length preferably extends from 0.5 m to 50 m in a forward direction of the vehicle.

As evident from the above-mentioned explanation, the distance measuring apparatus of the present embodiment may clearly measure a relative position, including its direction, between the vehicle and the obstacle just before their collision occurs. This apparatus ensures a very high speed response and can be adequately utilized to measure a relative-positional relation between those vehicles moving at high speeds. Even in the case where a colliding object is either a vehicle not equipped with a distance measuring apparatus or a building, on-road structure, etc., it is possible to measure and record such a relative-positional relation just before a collision occurs. This provides important information on investigation into a cause for the collision.

Further, it is possible to obtain information, such as a driver's vehicle speed and acceleration rate, while using speed pulses and acceleration sensor, and by doing so, to know the handle operation and braking operation by the driver at a collision accidents. This provides an influential clue to the investigation into the collision accident. The information, such as the distance, speed and acceleration rate thus obtained, is recorded, preferably like a flight recorder, in an impact-resistant and heat-resistant recording means.

Various changes or modifications of the present embodiment can be made without departing from the spirit and scope of the present invention. For example, instead of providing the two distance sensors 101 and 102 one at each front end of the vehicle, only a light transmitting section can be provided on one of both the front ends of the vehicle and a distance sensor can be provided on the other front end. Where, for example, the light transmitting section is provided at a location indicated by a mark a in FIG. 1B and the distance sensor is provided on a location indicated by a mark B, it follows that, when the light transmitting section a is lighted, AP+BP is measured, while, upon the lighting of the distance sensor B, 2 BP is measured. Based on the information above, the AP and BP are found by a simple calculation.

Further, the distance sensor can be mounted on the side, or the rear, of the vehicle for example. A mechanism may be provided for swinging the "enlarged light beam" in a left/right or right/left direction based on the information on the rotation direction of a steering wheel and on (angular) acceleration sensor when the wheel is turned to the right or to the left or is running on a curved path on a road. It is also possible to shorten the running direction length of the "enlarged light beam" and, by doing so, restrict the inflow of unnecessary information.

In another example, a light transmitting section 501 is provided at a front center of a vehicle 500 for sequentially electrically transmitting a plurality of fixed light beams as indicated by arrows in 5A and a pair of light receiving sections 502, 503 are provided one at each front end of the vehicle 500, so that it is possible to detect the distance and direction to an obstacle. In FIG. 5A, the arrow lengths are reflected by the intensities of the light beams and the intensities of the respective fixed light beams are so adjusted that the amounts of light are equally detected at the light receiving sections 502 and 503 when a standard target is placed at a forward end of the respective arrow.

As shown in FIG. 5B, distance sensors 504 and 505 including light transmitting and receiving sections may be provided on both ends of a vehicle 500 in which case two fixed light beams of a narrow open angle are alternately transmitted from the light transmitting section. In this case, a measurable area is an overlapped area of the two fixed light beams and there is some risk that a partly unmeasurable space will be left there. It is, however, possible to approximately measure the distance and azimuth up to the obstacle. Instead of the fixed light beam use can be made of a narrow beam of a millimeter wave.

As shown in FIG. 5C, a light transmitting section 507 is provided at a front center of a vehicle 500 for transmitting the "enlarged light beam" 506 and light receiving sections 508 and 509 may be provided one at each end of a vehicle 500. By the triangulation distance measurement using an interval between the two light receiving sections 508 and 509 as a baseline length it is possible to find the position (distance and azimuth) of the obstacle in the "enlarged light beam".

As another example, it is possible to detect a position (distance and direction) of an obstacle by transmitting a plurality of fixed millimeter wave from the front of a vehicle as in the case of FIG. 5A. A device for transmitting a plurality of fixed millimeter wave beams has, as shown in FIG. 6A for example, a plane mirror 600 and concave mirror 601 in a mutually opposite relation and electrodes 602 and 603 provided on the surfaces of the concave mirror 601 and plane mirror 600, respectively, to provide a millimeter wave resonator. The plane mirror 600 is connected to a millimeter wave source 610 via a millimeter wave transmitting guide path 611 and a proper joining section.

FIG. 6B shows the plane mirror 600 as viewed from a direction of an arrow 604 in FIG. 6A. As seen from FIG. 6B, an opening 605 is provided at the central area of the electrode 602 and, as a known technique, a beam having a Gaussian distribution is transmitted via that area. Holes 605 to 609 are provided around the central opening 605 and, like those light beams represented by the arrows in FIG. 5A, a plurality of millimeter wave beams are transmitted at both sides of a central millimeter wave beam via the holes 606 to 609.

When the millimeter wave beam is used, it is possible to advantageously obtain, in addition to the information on the position (distance and azimuth) of the obstacle, the speed information by the Doppler measurement.

The present invention is not restricted to the above-mentioned embodiment and various changes or modifications of the preset invention can be made without departing from the spirit and scope of the present invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measuring apparatus, provided on a movable body having at least two sides, for measuring a distance and an azimuth of an object present in a forward direction, comprising:

a wave transmitting device which transmits waves in a forward direction, the wave transmitting device including a single wave source and a deflection element for deflecting the waves emitted from the wave source in a plurality of directions, at least some of the waves being reflected by the object and returning to the apparatus;

a wave detecting device for detecting the waves reflected by the object which return to the apparatus; and a processing device which determines a distance and an azimuth of the object based on the reflected waves detected by the wave detecting device, wherein a measurable area formed by the waves transmitted from the wave transmitting device has a shape with a generally constant width extending for a predetermined length in the forward direction.

2. The apparatus according to claim 1, wherein the apparatus includes one or two wave transmitting devices, and two wave detecting devices mounted on the at least two sides of the movable body.

3. The apparatus according to claim 1, wherein the apparatus includes two wave transmitting devices, and the measurable area coincides with an area which is inside an overlapped area of two waves transmitted from the two wave transmitting devices and in which waves are received by the wave detecting devices with higher intensity than a predetermined value.

4. The apparatus according to claim 3, wherein the two wave transmitting devices alternately transmit the waves.

5. The apparatus according to claim 1, wherein the constant width of the measurable area extending for a predetermined length in the forward direction has a value which corresponds to at least a width and at most twice the width of the movable body.

6. The apparatus according to claim 1, wherein the predetermined length in which the measurable area by the transmitted waves extends with the constant width includes a length from 0.5 m to 50 m in a forward direction of the movable body.

7. A distance measuring apparatus, provided on a movable body having at least two sides, for measuring a distance and an azimuth of an object present in a forward direction, comprising:

wave transmitting means for transmitting waves in a forward direction, the wave transmitting means including a single wave source and a deflection element for deflecting the waves emitted from the wave source in a plurality of directions, at least some of the waves being reflected by the object and returning to the apparatus;

wave detecting means for detecting the waves reflected by the object which return to the apparatus; and processing means for processing a distance and an azimuth of the object based on the reflected waves detected by the wave detecting means, wherein a measurable area formed by the waves transmitted from the wave transmitting means has a shape with a generally constant width extending for a predetermined length in the forward direction.

8. The apparatus according to claim 7, wherein the apparatus includes one or two wave transmitting means, and the two wave detecting means mounted on the at least two sides of the movable body.

9. The apparatus according to claim 7, wherein the apparatus includes two wave transmitting means, and the measurable area coincides with an area which is inside an overlapped area of two waves transmitted from the two wave transmitting means and in which waves are received by the wave detecting means with higher intensity than a predetermined value.

10. The apparatus according to claim 9, wherein the two wave transmitting means alternately transmit the waves.

11. The apparatus according to claim 7, wherein the constant width of the measurable area extending for a predetermined length in the forward direction has a value which corresponds to at least a width and at most twice the width of the movable body.

12. The apparatus according to claim 7, wherein the predetermined length in which the measurable area by the transmitted waves extends with the constant width includes a length from 0.5 m to 50 m in a forward direction of the movable body.

13. A distance measuring method for measuring a distance and an azimuth of an object present in a forward direction, comprising:

a wave transmitting step for transmitting waves in a forward direction by use of a single wave source and a deflection element for deflecting the waves emitted from the wave source in a plurality of directions, at least some of the waves being reflected by the object;

a wave detecting step for detecting the waves reflected by the object; and a processing step for processing a distance and an azimuth of the object on the basis of information obtained by the wave detecting step, wherein a measurable area formed by the waves transmitted from the wave transmitting step has a shape with a generally constant width extending for a predetermined length in the forward direction.

* * * * *